(12) United States Patent
Kurokawa

(10) Patent No.: US 10,752,034 B2
(45) Date of Patent: Aug. 25, 2020

(54) METHOD FOR DETECTING EJECTION ABNORMALITY OF NOZZLE AND SYSTEM FOR DETECTING EJECTION ABNORMALITY OF NOZZLE

(71) Applicant: KYOCERA Document Solutions Inc., Osaka (JP)

(72) Inventor: Yuichiro Kurokawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/453,512

(22) Filed: Jun. 26, 2019

(65) Prior Publication Data

US 2020/0009889 A1 Jan. 9, 2020

(30) Foreign Application Priority Data

Jul. 3, 2018 (JP) .................. 2018-126661

(51) Int. Cl.
*B41J 29/38* (2006.01)
*B41J 2/16* (2006.01)
*B41J 2/14* (2006.01)

(52) U.S. Cl.
CPC ........... *B41J 29/38* (2013.01); *B41J 2/14153* (2013.01); *B41J 2/1603* (2013.01); *B41J 2002/14354* (2013.01)

(58) Field of Classification Search
CPC .. B41J 2/0451; B41J 2/04553; B41J 2/04563; B41J 2/04571; B41J 2/04581; B41J 2/14153; B41J 2/14233; B41J 2/1603; B41J 2/16517; B41J 2/16532; B41J 2/16538; B41J 2/16579; B41J 2/18; B41J 2/2139; B41J 2/2142; B41J 2002/14354; B41J 29/38
See application file for complete search history.

(56) References Cited

U.S. PATENT DOCUMENTS

| 7,616,340 B2 * | 11/2009 | Yamazaki | G06K 15/02 347/14 |
|---|---|---|---|
| 10,099,497 B2 * | 10/2018 | Nagashima | B41J 2/01 |
| 2013/0307896 A1 * | 11/2013 | Shinkawa | B41J 29/393 347/19 |
| 2017/0057266 A1 | 3/2017 | Kimura | 29/393 |

FOREIGN PATENT DOCUMENTS

| JP | H 08-323992 A | 12/1996 |
|---|---|---|
| JP | 2017-47613 A | 3/2017 |

* cited by examiner

*Primary Examiner* — Thinh H Nguyen
(74) *Attorney, Agent, or Firm* — Stein IP, LLC

(57) ABSTRACT

In a method for detecting an ejection abnormality of a nozzle according to the present disclosure, a plurality of nozzles of a liquid ejection head are caused to execute an operation of ejecting liquids so that a nozzle check pattern including check areas each drawn solely by each of the plurality of nozzles and a solid pattern including a solid printed area are formed on part of a sheet. A first density value indicating a density value of a ground color of the sheet and a second density value indicating a density value of the solid pattern are acquired. A threshold value for detecting an ejection abnormality of each of the plurality of nozzles is derived from the first density value and the second density value. It is determined, using the threshold value, whether or not each of the check areas of the nozzle check pattern is drawn.

5 Claims, 14 Drawing Sheets

FIG.11

| INK COLOR | WHITE REFERENCE (FIRST DENSITY VALUE AD1) | THIN LINE ASSUMED DENSITY (THIRD DENSITY VALUE AD3) | SOLID REFERENCE (SECOND DENSITY VALUE AD2) | THRESHOLD VALUE Th | DETERMINATION COLOR |
|---|---|---|---|---|---|
| YELLOW | 243.4 | 176.0 | 91.1 | 212.9 | BLUE |
| BLACK | 236.0 | 154.0 | 77.0 | 204.2 | RED |
| CYAN | 236.0 | 176.0 | 106.8 | 210.2 | RED |
| MAGENTA | 235.6 | 172.0 | 88.2 | 206.1 | GREEN |

◆ Th = (AD1 − AD2) × B + AD2
B = 0.8

<GROUNDWOOD PAPER>

METHOD FOR DETECTING EJECTION ABNORMALITY OF NOZZLE AND SYSTEM FOR DETECTING EJECTION ABNORMALITY OF NOZZLE

INCORPORATION BY REFERENCE

This application is based upon and claims the benefit of priority from the corresponding Japanese Patent Application No. 2018-126661 (filed on Jul. 3, 2018), the contents of which are incorporated herein by reference.

BACKGROUND

The present disclosure relates to a method and a system for detecting an ejection abnormality in a liquid ejection head having a plurality of nozzles for ejecting a liquid.

For example, an inkjet printer uses a liquid ejection head having a plurality of nozzles for ejecting an ink liquid. There may be a case where any of the nozzles becomes unable to properly eject the ink liquid due to factors such as clogging.

In detecting such an ejection failure nozzle, the liquid ejection head is operated to print a prescribed nozzle check pattern on a sheet, and the sheet is read by an optical reader. The nozzle check pattern includes check areas each drawn solely by each of the plurality of nozzles. Based on whether or not each of the check areas corresponding to the each of the plurality of nozzles is present in image data of the sheet read by the optical reader, it is determined whether or not the each of the plurality of nozzles is in an ejection failure state.

SUMMARY

A method for detecting an ejection abnormality of a nozzle according to one aspect of the present disclosure is to detect, in a liquid ejection head having a plurality of nozzles for ejecting liquids of prescribed respective colors, an ejection abnormality of each of the plurality of nozzles. The plurality of nozzles of the liquid ejection head are caused to execute an operation of ejecting the liquids so that a nozzle check pattern including check areas each drawn solely by each of the plurality of nozzles and a solid pattern including a solid printed area are formed on part of a sheet. The sheet is read by an optical reader so that image data of the sheet is obtained. Based on the image data, a first density value indicating a density value of a ground color of the sheet and a second density value indicating a density value of the solid pattern are acquired. A threshold value for detecting an ejection abnormality of each of the plurality of nozzles is derived from the first density value and the second density value. Based on the image data, it is determined, using the threshold value, whether or not each of the check areas of the nozzle check pattern is drawn.

A system for detecting an ejection abnormality of a nozzle according to another aspect of the present disclosure is provided with a liquid ejection head, an ejection control portion, an optical reader, and a processor. The liquid ejection head has a plurality of nozzles for ejecting liquids of prescribed respective colors. The ejection control portion controls an operation of ejecting the liquids from the plurality of nozzles. The optical reader reads an image of a sheet and generates image data thereof. Based on the image data, the processor executes a prescribed process. The ejection control portion forms, on part of a sheet, a nozzle check pattern including check areas each drawn solely by each of the plurality of nozzles and a solid pattern including a solid printed area. The optical reader reads the sheet on which the nozzle check pattern and the solid pattern have been formed and thus generates image data of the sheet. The processor includes a density acquisition portion, a threshold value setting portion, and a determination portion. Based on the image data, the density acquisition portion acquires a first density value indicating a density value of a ground color of the sheet and a second density value indicating a density value of the solid pattern. The threshold value setting portion sets, based on the first density value and the second density value, a threshold value for detecting an ejection abnormality of each of the plurality of nozzles. Based on the image data, the determination portion determines, using the threshold value, whether or not each of the check areas of the nozzle check pattern is drawn and determines which one of the plurality of nozzles is an ejection failure nozzle.

Still other objects of the present disclosure and specific advantages provided by the present disclosure will be made further apparent from the following description of an embodiment.

BRIEF DESCRIPTION OF THE DRAWINGS

FIG. 11 is a view in tabular form showing an example of setting a threshold value for determining an ejection failure nozzle.

DETAILED DESCRIPTION

Based on the appended drawings, the following describes an embodiment of the present disclosure. The present disclosure relates to a method and a system for detecting, in a liquid ejection head having a plurality of nozzles for ejecting liquids of prescribed respective colors, an ejection abnormality of each of the plurality of nozzles. This embodiment shows an example in which the liquids of prescribed respective colors are ink liquids and the liquid ejection head is an ink ejection head provided in an inkjet printer. This configuration is merely one embodiment of the present disclosure, and the present disclose is applicable also to a liquid ejection head for ejecting any other liquid (water, various types of aqueous solutions, a chemical solution, a culture medium, a disinfectant solution, or the like).

[Configuration of Inkjet Printer]

Figure 1:
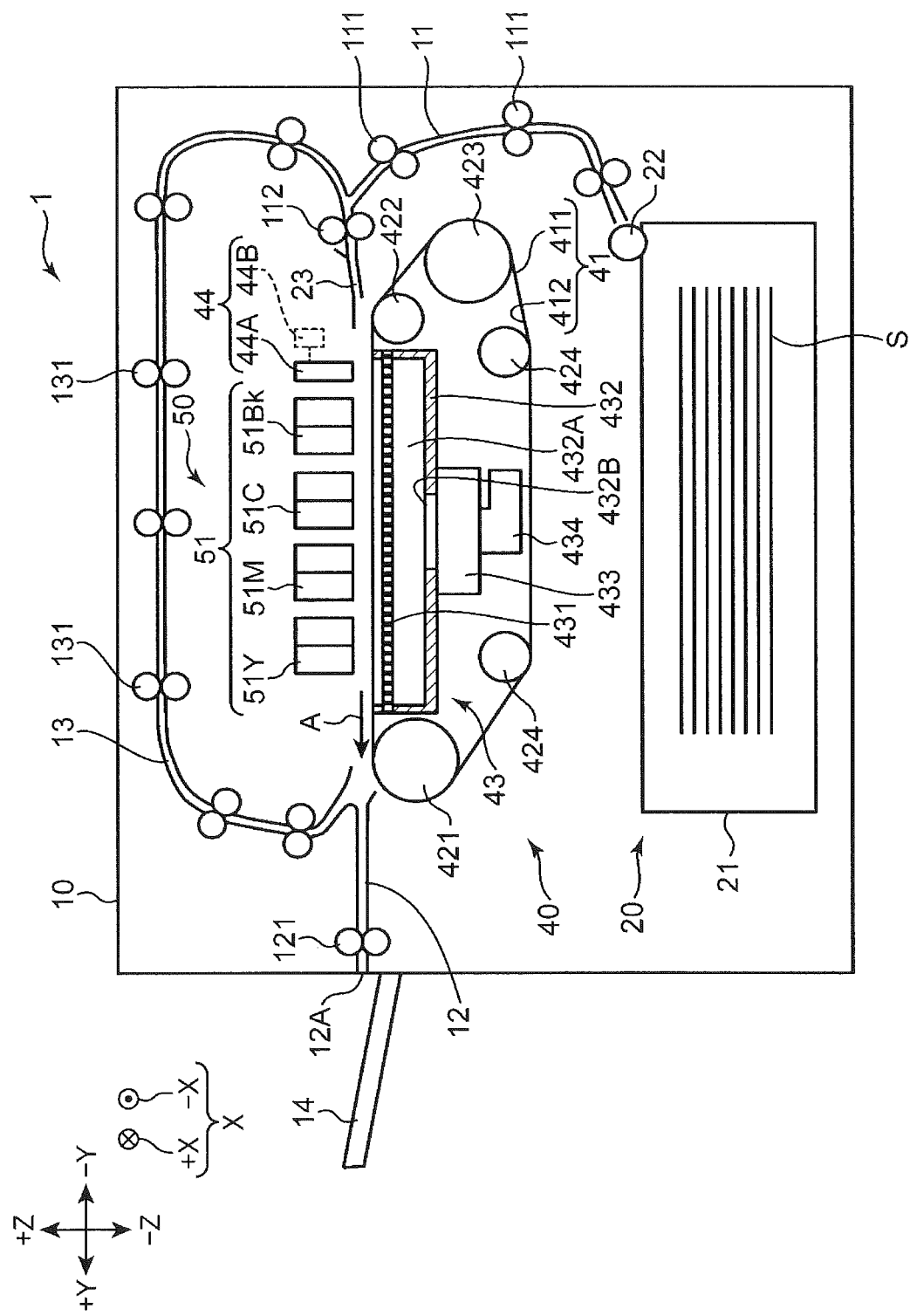
FIG. 1 is a schematic sectional view of an inkjet printer to which a nozzle abnormality detection method according to the present disclosure is applied.
Figure 2:
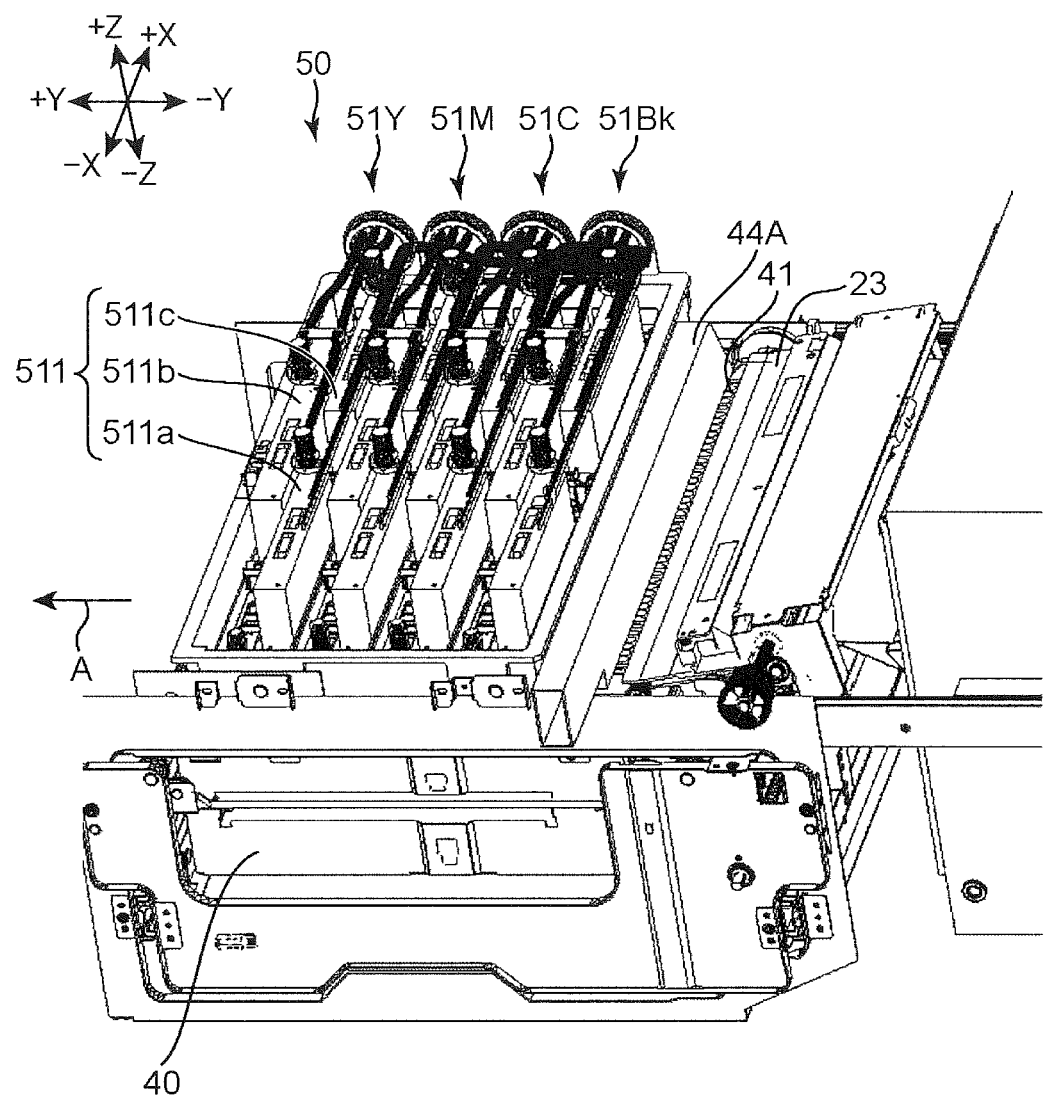
FIG. 2 is a perspective view showing part of an interior of the above-described inkjet printer.

First, a description is given of a configuration of an inkjet printer to which the method and system for detecting an abnormality of a nozzle according to the present disclosure are applied. FIG. 1 is a schematic sectional view of an inkjet printer 1, and FIG. 2 is a perspective view showing part of an interior of the inkjet printer 1. FIG. 1 and FIG. 2 include an indication of directions using XYZ orthogonal coordinate axes. The inkjet printer 1 is an inkjet-type printing apparatus that ejects ink droplets to form (print) an image on a sheet S. The inkjet printer 1 is provided with an apparatus main body 10, a paper feed portion 20, a sheet conveyor 40, and an image forming portion 50.

The apparatus main body 10 is a box-shaped housing that houses various types of devices for forming an image on the sheet S. In the apparatus main body 10, there are formed a first conveyance path 11, a second conveyance path 12, and a third conveyance path 13 that are paths along which the sheet S is conveyed.

The paper feed portion 20 feeds the sheet S to the first conveyance path 11. The paper feed portion 20 includes a paper feed cassette 21 and a pick-up roller 22. The paper feed cassette 21 is mountable to/demountable from the apparatus main body 10 and houses the sheet S therein. The pick-up roller 22 is disposed at an end portion of the paper feed cassette 21 on a −Y side and a +Z side. The pick-up roller 22 picks up the sheet S one by one from the paper feed cassette 21 and feeds it out to the first conveyance path 11.

The sheet S thus fed to the first conveyance path 11 is conveyed toward a registration roller pair 112 by first conveyance roller pairs 111 provided in the first conveyance path 11. The registration roller pair 112 corrects oblique conveyance of the sheet S. Furthermore, the registration roller pair 112 feeds out the sheet S toward the sheet conveyor 40 so as to be timed with an image forming process performed by the image forming portion 50. A guide portion 23 is provided at a downstream end of the first conveyance path 11. The guide portion 23 guides the sheet S fed out by the registration roller pair 112 toward the sheet conveyor 40.

The sheet conveyor 40 and the image forming portion 50 are arrayed in an up-down direction in the apparatus main body 10 so that the sheet conveyor 40 is on a -Z side (a lower side) and the image forming portion 50 is on the +Z side (an upper side). The sheet conveyor 40 conveys the sheet S, which has been supplied through the guide portion 23, in a sheet conveyance direction A toward the image forming portion 50. The sheet conveyor 40 includes a conveyance belt 41, a suction portion 43, and an air blowing portion 44.

The conveyance belt 41 is an endless belt and has a front surface 411 on an outer circumferential surface side thereof and a rear surface 412 on an inner circumferential surface side thereof. In a prescribed conveyance region of the conveyance belt 41, which is opposed to ink ejection heads 51 of the image forming portion 50, the conveyance belt 41 holds the sheet S on the front surface 411 and conveys it in the sheet conveyance direction A. The conveyance belt 41 is laid under tension over a first roller 421, a second roller 422, a third roller 423, and a pair of fourth rollers 424 that each have a rotation axis extending in an X direction. On an inner side of the conveyance belt 41 thus laid under tension over these rollers, the suction portion 43 is disposed so as to be opposed to the rear surface 412. The conveyance belt 41 is perforated with a multitude of suction holes (not shown) penetrating through the conveyance belt 41 in a thickness direction thereof from the front surface 411 to the rear surface 412.

The first roller 421 is a driving roller that drives the conveyance belt 41 to revolve and is disposed on a downstream side with respect to the suction portion 43 in the sheet conveyance direction A. When the first roller 421 is driven to rotate by an unshown motor, the conveyance belt 41 revolves to convey the sheet S held on the front surface 411 thereof in the sheet conveyance direction A. The second roller 422 is a roller that rotates following and in conjunction with rotation of the conveyance belt 41 and is disposed on an upstream side with respect to the suction portion 43. The first roller 421 and the second roller 422 collaborate with each other in maintaining flatness of the region of the conveyance belt 41 opposed to the ink ejection heads 51. The third roller 423 is a tension roller that applies a prescribed tensile force to the conveyance belt 41. The pair of fourth rollers 424 is a pair of driven rollers that guides the conveyance belt 41 to pass through the −Z side with respect to the suction portion 43.

The suction portion 43 generates a negative pressure between the conveyance belt 41 and the sheet S made to adhere to the front surface 411 of the conveyance belt 41 by the air blowing portion 44 and thus brings the sheet S into tight contact with the front surface 411 of the conveyance belt 41. The suction portion 43 includes a belt guidance member 431, a suction housing 432, a suction unit 433, and an air exhaust duct 434.

The belt guidance member 431 is a plate-shaped member having through holes provided therethrough and has a width substantially equal to a length of the conveyance belt 41 in a width direction thereof (the X direction). The belt guidance member 431 guides a revolving movement of the conveyance belt 41 in a region between the first roller 421 and the second roller 422. The suction housing 432 is a housing whose upper surface has an opening and that is disposed on the inner side of the conveyance belt 41. The suction housing 432 has a suction space 432A formed by covering the opening with the belt guidance member 431. The suction space 432A communicates with the suction holes of the conveyance belt 41 via the through holes of the belt guidance member 431.

An opening portion 432B is formed through a bottom wall of the suction housing 432, and the suction unit 433 is disposed so as to correspond to the opening portion 432B. The suction unit 433 includes a suction fan (not shown) to provide a negative pressure in the suction space 432A so that a suction force is generated in the suction holes of the conveyance belt 41. The air exhaust duct 434 is a duct for discharging air sucked by the suction unit 433 to the exterior. The air blowing portion 44 blows air toward the sheet S from an upper surface side of the sheet S so that the sheet S adheres to the front surface 411 of the conveyance belt 41. The air blowing portion 44 includes an air blowing duct 44A having an opening opposed to the sheet S and an air blower 44B that generates wind power in the air blowing duct 44A.

On the +Z side with respect to the sheet conveyor 40, the image forming portion 50 is disposed so as to be opposed to the front surface 411 of the conveyance belt 41. The image forming portion 50 functions as a processing portion that performs a prescribed process with respect to the sheet S and ejects ink droplets on the sheet S being conveyed in the sheet conveyance direction A while being held on the front surface 411 of the conveyance belt 41 so as to form an image thereon.

The image forming portion 50 includes the ink ejection heads 51 of four different colors (51Bk, 51C, 51M, and 51Y) arranged along the sheet conveyance direction A. The ink ejection heads 51Bk, 51C, 51M, and 51Y eject black ink droplets, cyan ink droplets, magenta ink droplets, and yellow ink droplets (liquids of prescribed respective colors), respectively. The ink ejection heads 51 eject ink droplets toward the sheet S being conveyed by the conveyance belt 41 and passing through a position opposed to the ink ejection heads 51. Thus, an image is formed on the sheet S.

As shown in FIG. 2, each of the ink ejection heads 51 includes a head portion 511 composed of a first head portion 511*a*, a second head portion 511*b*, and a third head portion 511*c*. The first head portion 511*a*, the second head portion 511*b*, and the third head portion 511*c* are arranged in a staggered manner along the X direction, which is the width direction of the conveyance belt 41. The head portion 511 has a multitude of nozzles 52 (schematically shown in FIG. 7) for ejecting ink droplets. This embodiment is to detect an ejection abnormality of each of the nozzles 52 included in the head portion 511.

The sheet S on which the image has been formed through ejection of ink droplets in the image forming portion 50 is conveyed by the conveyance belt 41 and fed out to the second conveyance path 12 provided to extend on a downstream side with respect to the conveyance belt 41. By a second conveyance roller pair 121 provided in the second conveyance path 12, the sheet S thus fed out is discharged onto a paper discharge tray 14 through a paper discharge slot 12A of the apparatus main body 10.

Meanwhile, in a case where the sheet S is subjected to double-sided printing, the second conveyance roller pair 121 reversely rotates to perform switchback conveyance of the sheet S so that the sheet S is conveyed into the third conveyance path 13. The sheet S is reversely conveyed by third conveyance roller pairs 131 provided in the third conveyance path 13 and supplied, in a state where front and rear sides of the sheet S are inverted, again on the front surface 411 of the conveyance belt 41 via the registration roller pair 112 and the guide portion 23. Then, while the sheet S is being conveyed by the conveyance belt 41, an image forming process with respect to the rear side of the sheet S is performed by the image forming portion 50. The sheet S with respect to which the double-sided printing has thus been completed passes through the second conveyance path 12 and is discharged onto the paper discharge tray 14 through the paper discharge slot 12A.

[Configuration of Nozzle Ejection Abnormality Detection System]

Figure 3:
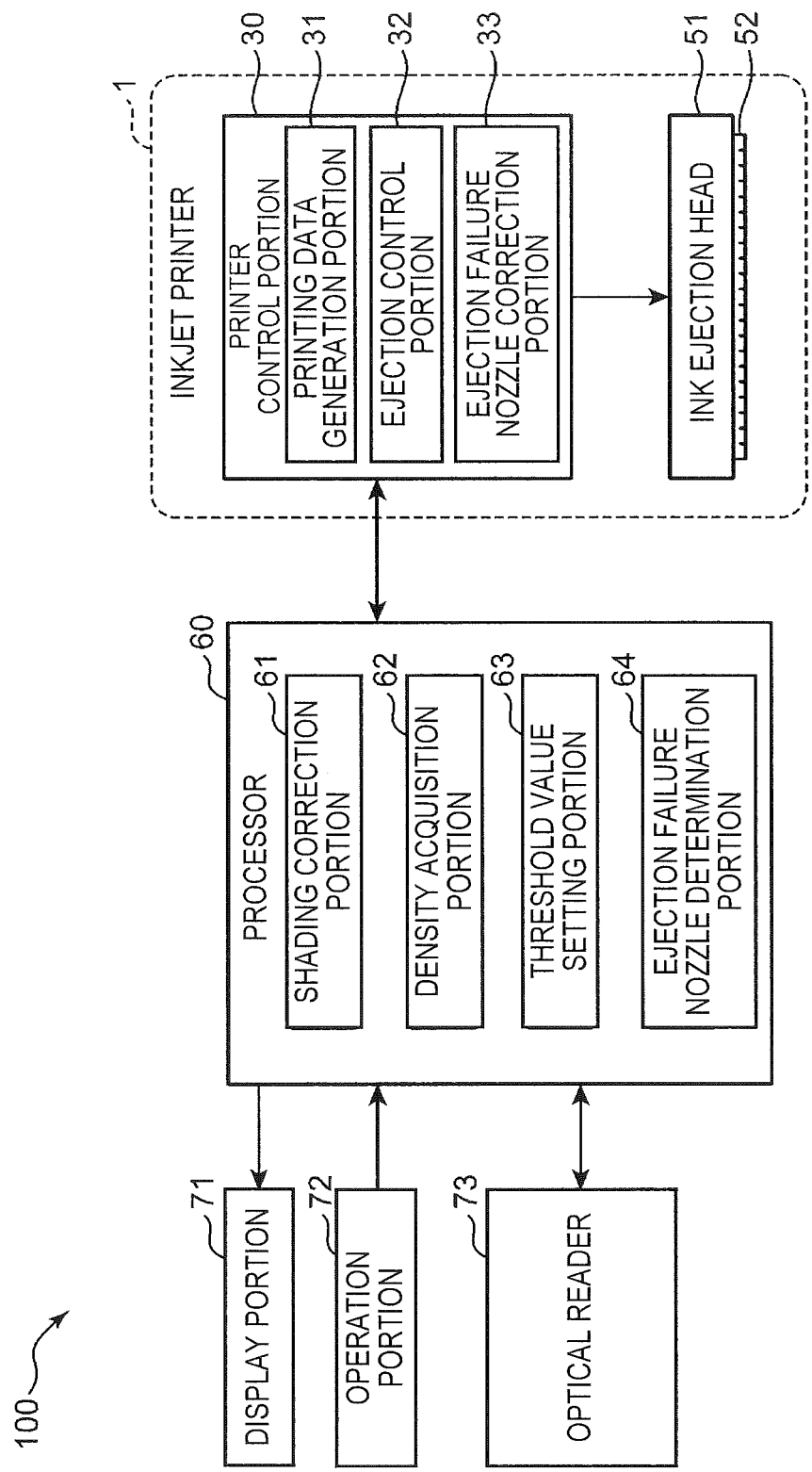
FIG. 3 is a block diagram showing a configuration of a nozzle ejection abnormality detection system according to the present disclosure.

Subsequently, with reference to FIG. 3, a description is given of a configuration of a nozzle ejection abnormality detection system 100 according to this embodiment for detecting an ejection abnormality (nozzle clogging or the like) of each of the nozzles 52 included in the ink ejection heads 51. The nozzle ejection abnormality detection system 100 includes a processor 60, a display portion 71, an operation portion 72, and an optical reader 73.

The processor 60 is formed of a microcomputer, a personal computer, or the like and executes various types of processes for detecting an ejection abnormality of each of the nozzles 52 included in the above-described ink ejection heads 51. The display portion 71 is formed of an LCD display panel or the like and displays various types of information related to the processor 60, information regarding results of the processes, and so on. The operation portion 72 is an input device composed of a keyboard, a touch panel, and so on and provides operational information, setting information, and so on to the processor 60. The processor 60 may be provided separately from or integrally with the inkjet printer 1. The display portion 71 may be provided separately from or integrally with the processor 60. The inkjet printer 1 may include the display portion 71. The operation portion 72 may be provided separately from or integrally with the processor 60. The inkjet printer 1 may include the operation portion 72.

The optical reader 73 includes an image sensor such as a CCD line sensor. The optical reader 73 optically reads an image of a sheet, generates image data corresponding to the image, and provides the image data to the processor 60. In this embodiment, the optical reader 73 optically reads a sheet on which an after-mentioned check chart 80 (see FIG. 5, etc.) is formed and generates image data of the sheet. Based on the image data, the processor 60 executes a prescribed process for detecting a nozzle ejection abnormality. The optical reader 73 may be provided separately from the inkjet printer 1 or built into the apparatus main body 10. In the latter case, the optical reader 73 can be disposed on a most downstream side with respect to the image forming portion 50 or in the second conveyance path 12.

When a prescribed program is executed, the processor 60 operates to functionally include a shading correction portion 61, a density acquisition portion 62, a threshold vale setting portion 63, and an ejection failure nozzle determination portion 64 (a determination portion). Depending on a reading unevenness characteristic in a main scanning direction in which scanning of a sheet is performed by the optical reader 73, the shading correction portion 61 performs correction (shading correction) with respect to the image data inputted from the optical reader 73 and thus eliminates the reading unevenness.

Based on the image data that has thus been subjected to the shading correction, the density acquisition portion 62 acquires density information on the sheet on which the check chart 80 has been printed. The density acquisition portion 62 calculates a density value of each of colors of RGB (blue, red, and green). Based on the density information acquired by the density acquisition portion 62, the threshold value setting portion 63 sets a threshold value for detecting an ejection abnormality of each of the nozzles 52. The ejection failure nozzle determination portion 64 determines, using the threshold value set by the threshold value setting portion 63, whether or not each of check areas of the check chart 80 allotted to the nozzles 52, respectively, is drawn. Also, based on a result of the determination, the ejection failure nozzle determination portion 64 determines which one of the nozzles 52 is an ejection failure nozzle. A further detailed description is given later of these functional portions.

The inkjet printer 1 is provided with a printer control portion 30 that controls a printing operation performed by the ink ejection heads 51. The printer control portion 30 functionally includes a printing data generation portion 31, an ejection control portion 32, and an ejection failure nozzle correction portion 33. Based on printing image data provided to the inkjet printer 1, the printing data generation portion 31 generates printing data used for actual printing on a sheet. Furthermore, when a nozzle checking process (an ejection abnormality detection process) with respect to the ink ejection heads 51 is executed, the printing data generation portion 31 generates printing data used for printing the check chart 80 on a sheet.

The ejection control portion 32 controls an operation of ejecting ink droplets of each of the multitude of nozzles 52 included in the ink ejection heads 51 so that an image corresponding to the printing data is printed on a sheet.

Upon an ejection failure nozzle being determined in the processor 60, the ejection failure nozzle correction portion 33 executes various types of correction processes. For example, when having received, from the processor 60, information that one of the nozzles 52 is an ejection failure nozzle, the ejection failure nozzle correction portion 33 performs a process in which an image that should have been drawn by the ejection failure nozzle is complemented by, for example, increasing an amount of ink droplets to be ejected by some of the other ejection nozzles 52 neighboring the ejection failure nozzle. Alternatively, the ejection failure nozzle correction portion 33 controls a nozzle cleaning mechanism or a nozzle purge mechanism (none of these is shown) included in the inkjet printer 1 to execute a wiping operation (wiping of a nozzle ejection port) or a purge operation (ejection of an ink liquid or a cleaning solution under a high pressure) with respect to the ink ejection heads 51 or provides them with an instruction to increase the number of times or frequency of executing these operations.

[Nozzle Checking Process]

Subsequently, based on a flow chart shown in FIG. 4, a description is given of an overall flow of a nozzle checking process for detecting a nozzle ejection abnormality. The nozzle checking process is a process carried out exclusively by a user in order to perceive whether or not nozzle clogging or the like has occurred during use of the inkjet printer 1. First, a sheet (the sheet S) prepared by the user is placed in the paper feed portion 20, and a process is executed in which the inkjet printer 1 prints an image of the check chart 80 on the sheet (Step S1). Specifically, image data of the check chart 80 is provided to the printing data generation portion 31, and the printing data generation portion 31 generates printing data thereof. Based on the printing data, the ejection control portion 32 controls the ink ejection heads 51 so that the check chart 80 is printed on the sheet. The image data of the check chart 80 is stored beforehand in a storage portion (not shown) of the inkjet printer 1.

Next, the sheet on which the check chart 80 has thus been printed is optically read by the optical reader 73, and image data of the sheet thus read is generated (Step S2). The image data is then transmitted to the processor 60. Based on the image data, the processor 60 detects, among the nozzles 52 included in the ink ejection heads 51, an ejection failure nozzle failing to properly eject ink droplets (Step S3). Based on a flow chart of FIG. 8, a detailed description is given later of this ejection failure nozzle detection process. Then, based on a result of the detection of an ejection failure nozzle at Step S3, with respect to the inkjet printer 1, the ejection failure nozzle correction portion 33 executes a process for reflecting the result of the detection, such as the above-described complementing process, the wiping operation, or the purge operation (Step S4).

Figure 5:
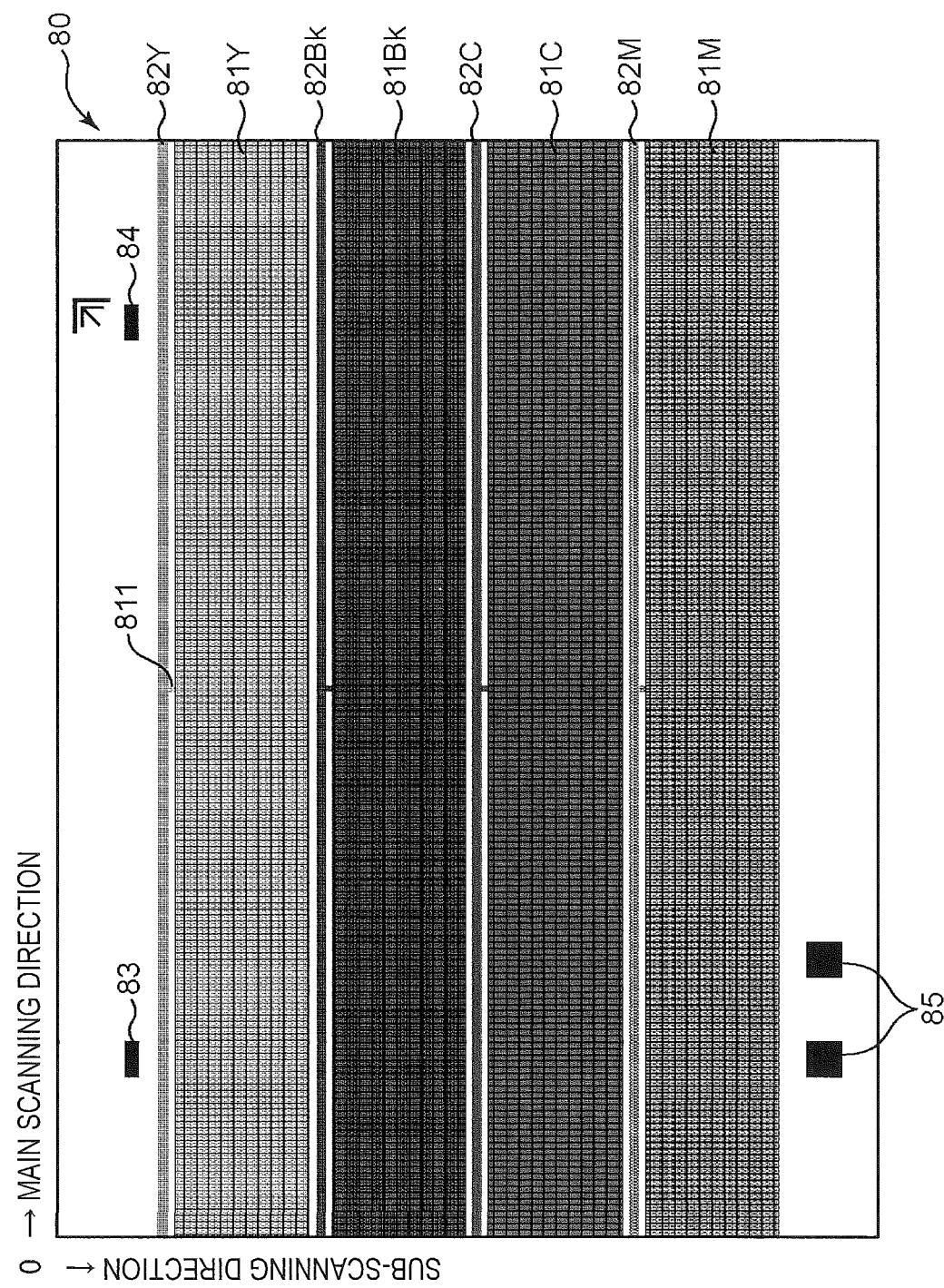
FIG. 5 is a view showing one example of a check chart for detecting a nozzle ejection abnormality.

FIG. 5 is a plan view showing one example of the check chart 80 for detecting a nozzle ejection abnormality, which is printed on a sheet by the ejection control portion 32. The check chart 80 includes nozzle check patterns 81Y, 81Bk, 81C, and 81M, solid patterns 82Y. 82Bk, 82C, and 82M, a first reference patch 83, a second reference patch 84, and a pair of third reference patches 85. The nozzle check pattern 81Y and the solid pattern 82Y are drawn using yellow ink droplets. The nozzle check pattern 81Bk and the solid pattern 82Bk are drawn using black ink droplets. The nozzle check pattern 81C and the solid pattern 82C are drawn using cyan ink droplets. The nozzle check pattern 81M and the solid pattern 82M are drawn using magenta ink droplets. The first reference patch 83, the second reference patch 84, and the pair of third reference patches 85 are drawn in order to determine a pattern position.

Each of the nozzle check patterns 81Y, 81Bk, 81C, and 81M is patterned in a mesh drawn by a thin line and is a band-shaped pattern having a prescribed width in a sub-scanning direction and extending over an entire region in the main scanning direction. FIG. 5 shows an example in which the nozzle check pattern 81Y of yellow (81Y), the nozzle check pattern 81Bk of black (81Bk), the nozzle check pattern 81C of cyan (81C), and the nozzle check pattern 81M of magenta (81M) are arranged in this order from an upstream side in the sub-scanning direction. The nozzle check patterns 81Y, 81Bk, 81C, and 81M are each provided additionally with a reference address pattern 811 drawn at a center position in the main scanning direction.

On the other hand, the solid patterns 82Y, 82Bk, 82C, and 82M are solid patterns printed using ink droplets of the respective colors and are each a thin band-shaped pattern having a small width in the sub-scanning direction and extending over the entire region in the main scanning direction. FIG. 5 shows an example in which each of the solid patterns 82Y, 82Bk, 82C, and 82M of the respective colors is formed on an upstream side in the sub-scanning direction with respect to and adjacently to a corresponding one of the nozzle check patterns 81Y, 81Bk, 81C, and 81M of the respective colors.

The first to third reference patches 83 to 85 are each a small-area rectangular solid pattern printed in a black color and arranged outside a region in which the nozzle check patterns 81Y, 81Bk, 81C, and 81M and the solid patterns 82Y, 82Bk, 82C, and 82M are formed. The first reference patch 83 is arranged on an upstream side with respect to the solid pattern 82Y in the sub-scanning direction and in a vicinity of an upstream side in the main scanning direction. The second reference patch 84 is arranged at the same position as the position of the first reference patch 83 in the sub-scanning direction and in a vicinity of a downstream side in the main scanning direction. The pair of third reference patches 85 are arranged on a downstream side with respect to the nozzle check pattern 81M in the sub-scanning direction and in the vicinity of the upstream side in the main scanning direction.

Figure 6:
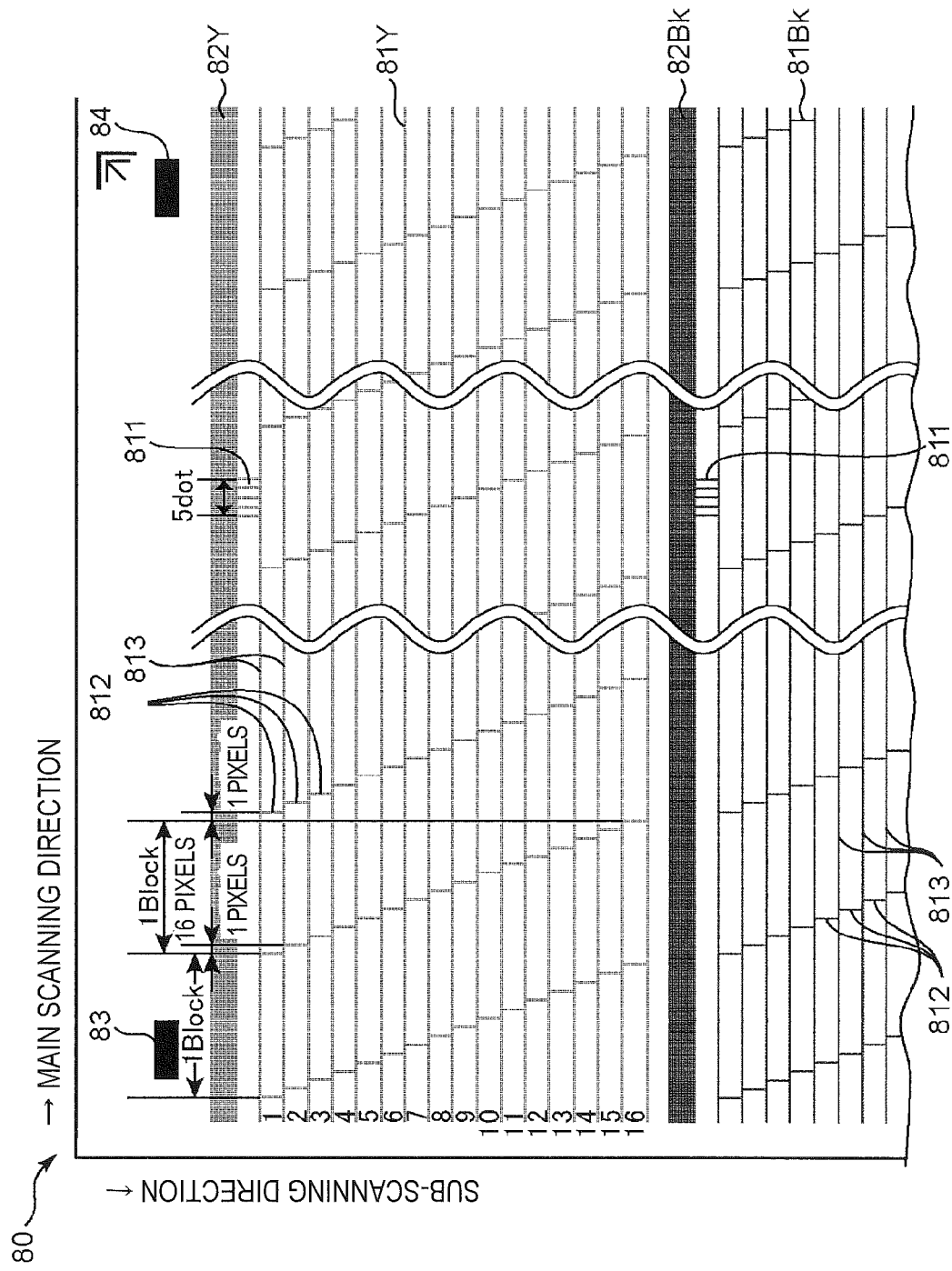
FIG. 6 is an enlarged view of a part of the above-described check chart.

FIG. 6 is an enlarged view of a part of the check chart 80 (a vicinity of the upstream sides in the sub-scanning direction and the main scanning direction). Each of the nozzle check patterns 81Y, 81Bk, 81C, and 81M is composed of an individual pattern 812 (a check area) formed of a short longitudinal line (a line extending in the sub-scanning direction) pattern and an identification line 813 formed of a long transverse line (a line extending in the main scanning direction) pattern. The individual patterns 812 are each a thin line pattern drawn solely by a single one of the multitude of nozzles 52 included in the ink ejection head 51. The solid patterns 82Y, 82Bk, 82C, and 82M, on the other hand, are each a solid printing pattern drawn using some or all of the nozzles 52 that eject ink droplets of a corresponding one of the respective colors.

The individual pattern 812 is drawn for, among a multitude of pixels (the nozzles 52) arrayed in the main scanning direction, a prescribed plurality of pixels as one block. FIG. 6 shows an example in which 16 pixels constitute one block.

By a first one of the 16 pixels (a single one of the nozzles 52), one individual pattern 812 is drawn at a prescribed position in the sub-scanning direction. Next, by a second one of the 16 pixels adjacent to the first pixel, another individual pattern 812 is drawn at a position shifted to the downstream side in the sub-scanning direction. In this manner, as numbered from 1 to 16 in FIG. 6, 16 columns of individual patterns 812 corresponding to the 16 pixels are drawn at positions gradually shifted to the downstream side in the sub-scanning direction and to the downstream side in the main scanning direction. The identification line 813 is a line indicating a boundary between the 16 columns of individual patterns 812.

Figure 7:
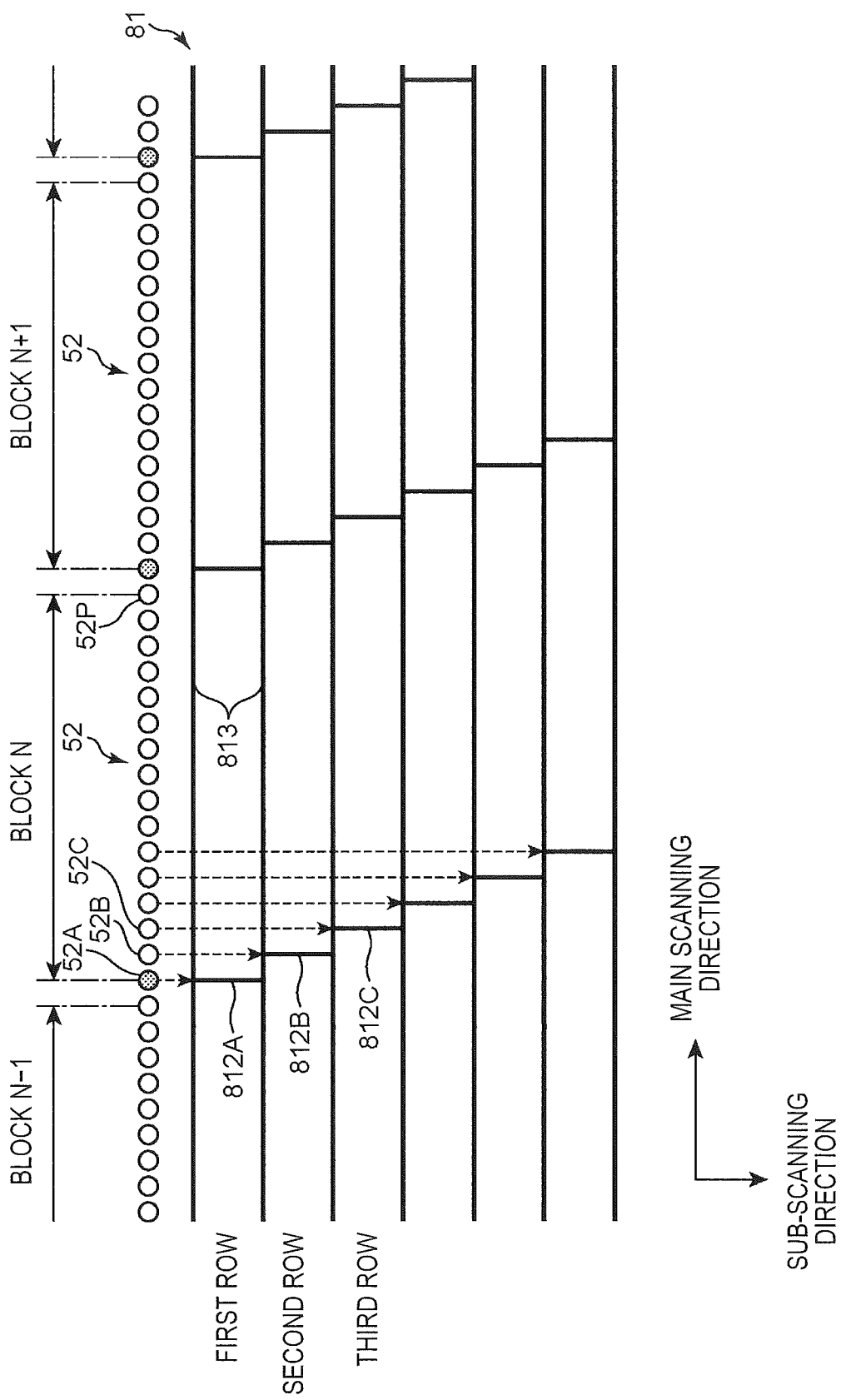
FIG. 7 is a view for explaining a nozzle check pattern.

FIG. 7 is a further explanatory view of the nozzle check patterns 81. Herein, the nozzles 52 are schematically shown in place of the above-described pixels. One block N is composed of 16 nozzles 52A, 52B, 52C, . . . and 52P. The same applies also to each of other blocks N+1 and N−1. Focusing on the block N, the ejection control portion 32 controls, among the 16 nozzles 52A to 52P, the nozzle 52A positioned on a most upstream side in the main scanning direction to execute an operation of ejecting ink droplet. Thus, a first-column individual pattern 812A on a most upstream side in the sub-scanning direction is drawn on a sheet so as to have a prescribed width in the sub-scanning direction. After that, the identification line 813 extending in the main scanning direction is drawn.

Subsequently, by the nozzle 52B adjacent on the downstream side to the nozzle 52A in the main scanning direction, a second-column individual pattern 812B is drawn on a downstream side with respect to the individual pattern 812A in the sub-scanning direction. Naturally, the second-column individual pattern 812B is drawn at a position shifted in the main scanning direction with respect to the first-column individual pattern 812A by a distance corresponding to a difference between positions at which the nozzle 52A and the nozzle 52B are disposed, respectively. Further subsequently, by the nozzle 52C adjacent to the nozzle 52B, a third-column individual pattern 812C is drawn. The third-column individual pattern 812C is also drawn at a position shifted in the sub-scanning direction and in the main scanning direction with respect to the second-column individual pattern 812B. The individual patterns 812 in fourth and remaining rows are also drawn in a similar manner.

That is, the individual patterns 812A to 812C drawn by the nozzles 52A to 52C, respectively, each have intrinsic addresses of a sub-scanning position and a main scanning position. These addresses can be expressed in coordinates relative to the first to third reference patches 83 to 85 as reference positions. Then, a density value of the sheet at each of coordinate positions at which the individual patterns 812A to 812C should be drawn is acquired, and thus it is possible to determine, based on the density value, whether or not each of the nozzles 52A to 52C is an ejection failure nozzle.

For example, in a case where the nozzle 52B is clogged, the second-column individual pattern 812B is not properly drawn and does not appear on the sheet. Because of this, in image data obtained by the optical reader 73 through reading of the sheet, a density value at coordinates at which the individual pattern 812B should be present indicates a ground color of the sheet. In a case where the individual pattern 812B is properly drawn, a density value at the coordinates indicates a color darker than the ground color of the sheet. Accordingly, it can be perceived that the nozzle 52B is an ejection failure nozzle.

Depending on a type of a sheet used in the above-described detection of an ejection failure nozzle, however, it may not be possible to accurately detect the nozzle check patterns 81. For example, in a case of using a sheet of poor quality paper, recycled paper, groundwood paper, or a rear side of a printed sheet (so-called backing paper), it may not be possible to appropriately determine whether or not the individual patterns 812A to 812C of the nozzle check patterns 81 have been properly printed. Specifically, there occurs a decrease in density difference between a ground color of the sheet inferior in whiteness and a pattern color, leading to a possibility that the use of a fixedly set density threshold value does not allow accurate distinction between these colors. Typically, the check chart 80 is printed on the sheet by a user. Some users may avoid use of high-quality paper to detect an ejection failure nozzle, in which case there is a problem that accuracy in detecting an ejection failure nozzle might be decreased. This embodiment provides an ejection failure nozzle detection process that can solve this problem.

[Ejection Failure Nozzle Detection Process]

Figure 4:
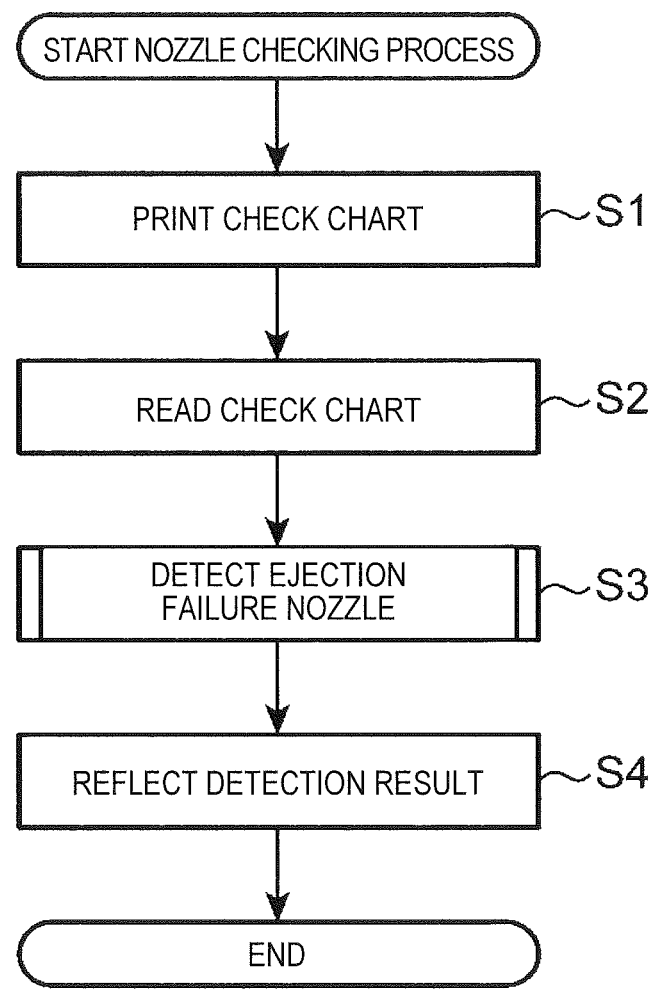
FIG. 4 is a flow chart of a nozzle checking process executed by the above-described nozzle ejection abnormality detection system.
Figure 8:
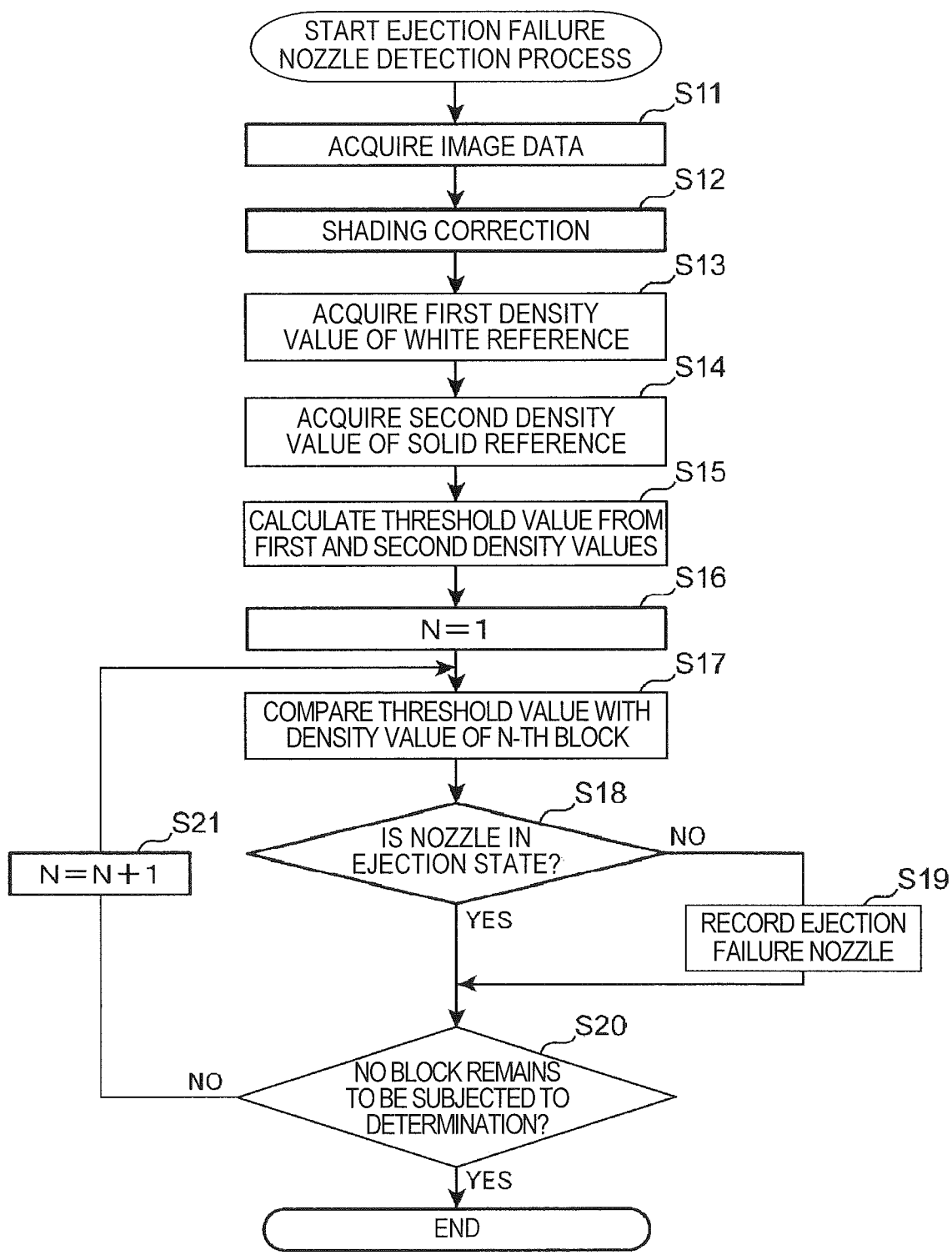
FIG. 8 is a flow chart of an ejection failure nozzle detection process executed by the above-described nozzle ejection abnormality detection system.

FIG. 8 is a flow chart of an ejection failure nozzle detection process executed by the nozzle ejection abnormality detection system 100, which shows a detail of the process at Step S3 in the flow shown in FIG. 4. At a point in time of starting the process, the check chart 80 illustratively shown in FIG. 5 has been printed on a sheet by the inkjet printer 1, and the sheet has been read by the optical reader 73 (Steps S1 and S2 in FIG. 4). Upon the start of the process, the processor 60 obtains, from the optical reader 73, image data generated through reading of the sheet on which the check chart 80 has been printed (Step S11).

With respect to the image data thus acquired, the shading correction portion 61 of the processor 60 performs shading correction for eliminating reading unevenness of the optical reader 73 (Step S12). Before the sheet on which the check chart 80 has been printed is actually read by the optical reader 73, reading unevenness of the optical reader 73 is detected. That is, a reading unevenness detection chart is read by the optical reader 73 so that a reading unevenness characteristic in the main scanning direction attributable to an error or unevenness in characteristics in an optical system is derived therefrom. The reading unevenness characteristic is stored in a storage portion (not shown) of the processor 60. Referring to the reading unevenness characteristic, the shading correction portion 61 corrects the image data acquired at Step S11 so as to cancel out the reading unevenness.

Subsequently, the density acquisition portion 62 finds, in the image data, a ground color area on the sheet and also acquires a first density value indicting a density value of the ground color of the sheet (Step S13). The first density value indicates a density of an area on the sheet, which has not been subjected to a printing process, and hence a density of a white reference on the sheet.

Figure 9:
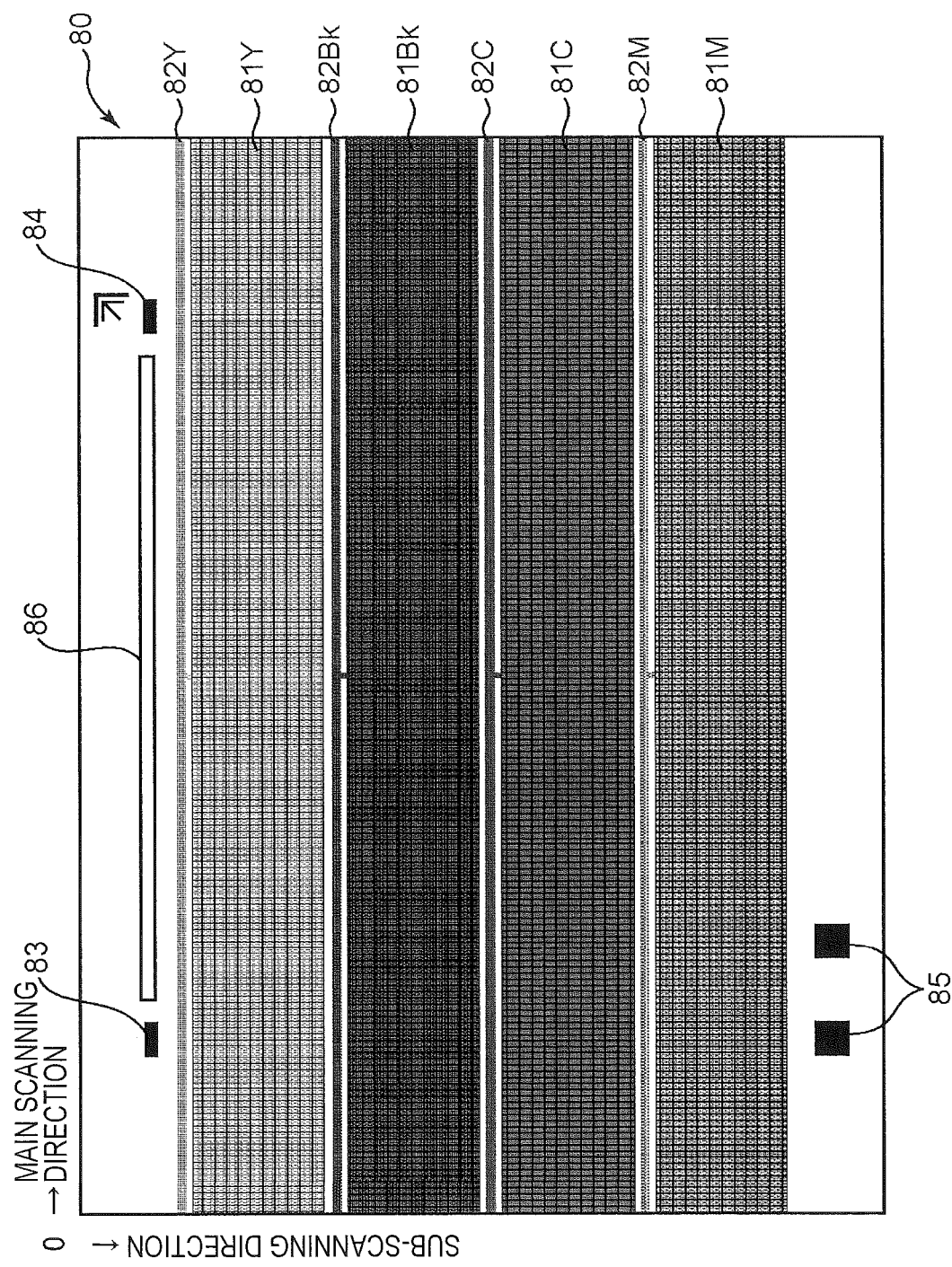
FIG. 9 is a view for explaining a process of acquiring a first density value of a white reference.

FIG. 9 is a view for explaining an example of a process of acquiring the first density value of the white reference. The check chart 80 is printed on part of a sheet and not on an entire region of the sheet. Because of this, there is an area on the sheet, in which a ground color of the sheet is directly exposed. FIG. 9 shows an example in which such a ground color area is present in each of a vicinity of an upstream end and a vicinity of a downstream end in the sub-scanning direction, and the vicinity of the upstream end is set as a ground color reading region 86 for reading a density of the ground color. In order to find the ground color reading region 86, the density acquisition portion 62 uses positional information regarding the first reference patch 83 and the second reference patch 84. For example, based on a distance (the number of dots) from a right end edge of the first reference patch 83 and a distance from a left end edge of the second reference patch 84, the density acquisition portion 62 determines the ground color reading region 86. In other words, the ground color reading region 86 is set at a position (a position between the patches) that can be easily determined using the first reference patch 83 and the second reference patch 84.

Instead of acquiring the first density value by detecting a density value at any one point in the ground color reading region 86, the density acquisition portion 62 acquires, as the first density value, an average of density values of the ground color of the sheet detected at a plurality of locations in the ground color reading region 86. For example, the density acquisition portion 62 sets the ground color reading region 86 in a range of 4,750 pixels in the main scanning direction and 10 pixels in the sub-scanning direction between the first reference patch 83 and the second reference patch 84 and determines the first density value of the white reference by determining an average of density values of these pixels. Thus, a highly reliable density value of the ground color can be acquired. The density acquisition portion 62 calculates the first density value for each of the colors of RGB.

Moreover, the density acquisition portion 62 finds, in the image data, areas on the sheet, on which the solid patterns 82Y, 82Bk, 82C, and 82M have been printed, respectively, and also acquires a second density value indicating a density value of each of the solid patterns 82Y, 82Bk, 82C, and 82M (Step S14). The second density value indicates a density of an area on the sheet, on which solid printing has been performed using an ink liquid of each of the respective colors, and hence a density of a solid reference on the sheet.

Figure 10:
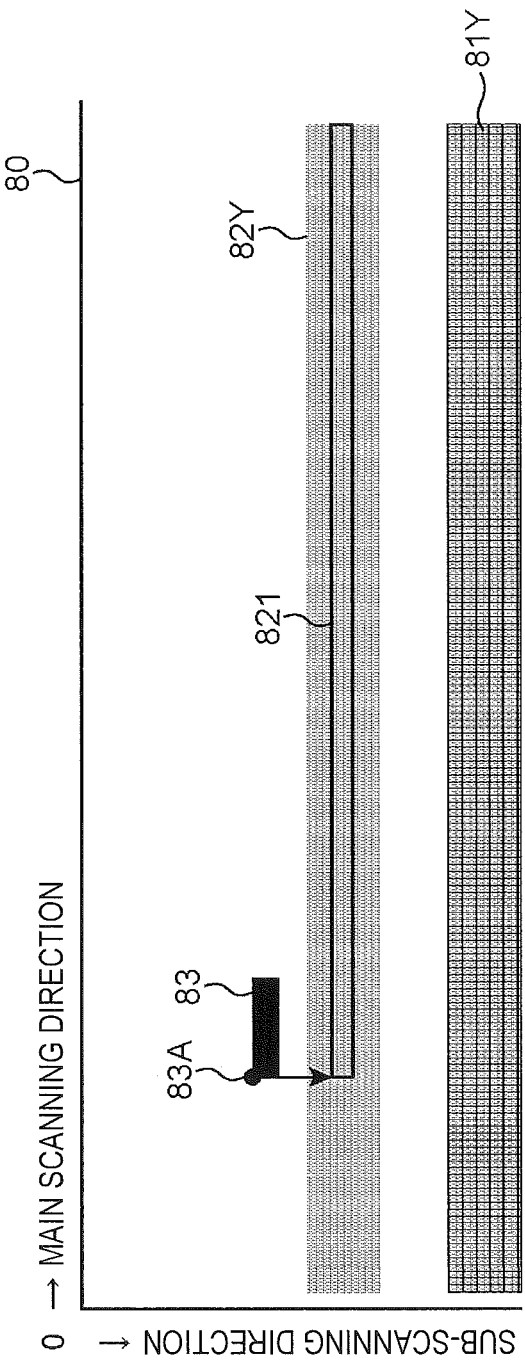
FIG. 10 is a view for explaining a process of acquiring a second density value of a solid reference.

FIG. 10 is a view for explaining an example of a process of acquiring the second density value of the solid reference. Herein, there is shown an example of acquiring the second density value of the yellow solid pattern 82Y. A solid reading region 821 for detecting a density value of a solid pattern is set in the solid pattern 82Y. In order to find the solid reading region 821, the density acquisition portion 62 uses, for example, positional information regarding the first reference patch 83. FIG. 10 shows an example in which a corner portion of the first reference patch 83 on a most upstream side in the sub-scanning direction and on a most upstream side in the main scanning direction is used as a reference position 83A, and the solid reading region 821 is found based on a distance (the number of dots) from the reference position 83A in the sub-scanning direction. For example, density values at various distances from the reference position 83A in the sub-scanning direction are examined so as to find an area corresponding to an edge of the solid pattern 82Y, and a position advanced a prescribed distance from the edge is determined as a region in which the solid reading region 821 starts.

Instead of acquiring the second density value by detecting a density value at any one point in the solid reding region 821, the density acquisition portion 62 acquires, as the second density value, an average of density values of the solid pattern 82Y detected at a plurality of locations in the solid reading region 821. For example, the density acquisition portion 62 sets the solid reading region 821 in a range of 5,000 pixels in the main scanning direction and 10 pixels in the sub-scanning direction in the solid pattern 82Y and determines the second density value of the solid reference by determining an average of density values of these pixels. The density acquisition portion 62 calculates the second density value for each of the colors of RGB.

Subsequently, the threshold value setting portion 63 performs a process of deriving a threshold value for detecting an ejection abnormality of each of the nozzles 52 from the first density value and the second density value acquired by the density acquisition portion 62 (Step S15). That is, this embodiment does not use a fixed threshold value to detect an ejection abnormality. To be more specific, the threshold value is derived from the first density value (the white reference) that is a density value of a ground color of a sheet used for printing of the check chart 80 and a density value of an ink liquid used to perform solid printing on the sheet, namely, the second density value (the solid reference) that is a solid printing density value reflecting an adhesion state of ink on the sheet. The threshold value is a local threshold value for the sheet used for printing of the solid patterns 82 and reflects a type of the sheet.

Herein, the threshold value to be determined is denoted as Th, the first density value as AD1, the second density value as AD2, and a third density value indicating an assumed density value of the individual pattern 812 (the check area) as AD3. The individual pattern 812 is a thin line pattern drawn by ejecting ink droplets from a single one of the nozzles 52 and thus has a density value lower than the second density value AD2 of the solid reference. These density values are expressed in terms of gradation values. Accordingly, there is established a relationship AD1>AD3>AD2. Under these circumstances, the threshold value setting portion 63 calculates the threshold value Th using an expression (1) below:

$$Th=(AD1-AD2) \times B \times AD2 \qquad (1)$$

where B is a coefficient set in such a range that Th>AD3.

The coefficient B in the above expression (1) is a coefficient for setting the threshold value Th to an appropriate value between the first density value AD1 of the white reference and the third density value AD3 that is an assumed density value of the individual pattern 812, and a value less than 1 is selected as the coefficient B. When the coefficient B has a value extremely approximate to 1, the threshold value Th has a value approximate to the first density value AD1, so that it becomes likely that a ground color of a sheet is erroneously determined to be the individual pattern 812. On the other hand, when the coefficient B has a value extremely smaller than 1, it becomes likely that the individual pattern 812, though drawn, is erroneously determined to be the ground color (an ejection failure). While depending on properties of a sheet and/or a type of an ink liquid, in view of the above, it is desirable that the coefficient B have a value selected from a range of about 0.9 to 0.6.

FIG. 11 is a view in tabular form showing an example of setting the threshold value Th for determining an ejection failure nozzle. In FIG. 11, density values are expressed in terms of gradation values, and a larger gradation value indicates a brighter color (white), while a smaller gradation value indicates a darker color. In the example shown in FIG. 11, the threshold value Th is calculated with the coefficient B in the above expression (1) set to "0.8" for each of all the ink colors of yellow, black, cyan, and magenta. Of course, the coefficient B may be set to vary depending on the ink colors. As a determination color, among the three RGB colors of red, green, and blue for each of the ink colors, a color with a largest amount of change in gradation value between the white reference and the solid reference is selected.

Upon the threshold value Th being determined, a transition is made to a process of determining whether or not each of the nozzles 52 is in an ejection failure state. The ejection failure nozzle determination portion 64 sets a counter of a block number N allotted to each determination block including one individual pattern 812 at N=1 (Step S16). Subsequently, the ejection failure nozzle determination portion 64 compares the threshold value Th set at Step S15 with a density (a gradation value) detected in an N-th determination block (Step S17). Then, using the threshold value Th, the ejection failure nozzle determination portion 64 determines whether or not the individual pattern 812 is drawn in the N-th determination block, i.e., whether or not one of the nozzles 52 corresponding to the N-th determination block is an ejection failure nozzle (Step S18).

Specifically, the ejection failure nozzle determination portion 64 determines whether or not a gradation value of the N-th determination block exceeds a gradation value of the threshold value Th. For example, in a case of a yellow ink color shown in FIG. 11, a gradation value of the threshold value Th is 212.9. When the individual pattern 812 is properly drawn in this block, a gradation value less than the threshold value Th is detected. In this case, it is determined that the one of the nozzles 52 is in an "ejection state." On the other hand, when the individual pattern 812 is not drawn, a gradation value equal to or more than the threshold value Th is detected. In this case, it is determined that the one of the nozzles 52 corresponding to this block is in an "ejection failure state".

Upon determining that the one of the nozzles 52 is in the "ejection failure state" (NO at Step S18), the ejection failure nozzle determination portion 64 records, in the storage portion (not shown) of the processor 60, an identifier, such as an address, allotted to the ejection failure nozzle (Step S19). Upon determining that the one of the nozzles 52 is in the "ejection state" (YES at Step S18) or ending the recording at Step S19, the ejection failure nozzle determination portion 64 checks whether or not any block remains to be subjected to the determination (Step S20). In a case where any determination block remains to be subjected to the determination (NO at Step S20), the ejection failure nozzle determination portion 64 sets the counter of the block number N at N=N+1 (Step S21). Then, returning to Step S17, the ejection failure nozzle determination portion 64 executes a similar determination process with respect to the N+1-th block. On the other hand, in a case where there remains no such a determination block (YES at Step S20), the ejection failure nozzle determination portion 64 ends the process.

Figure 12:
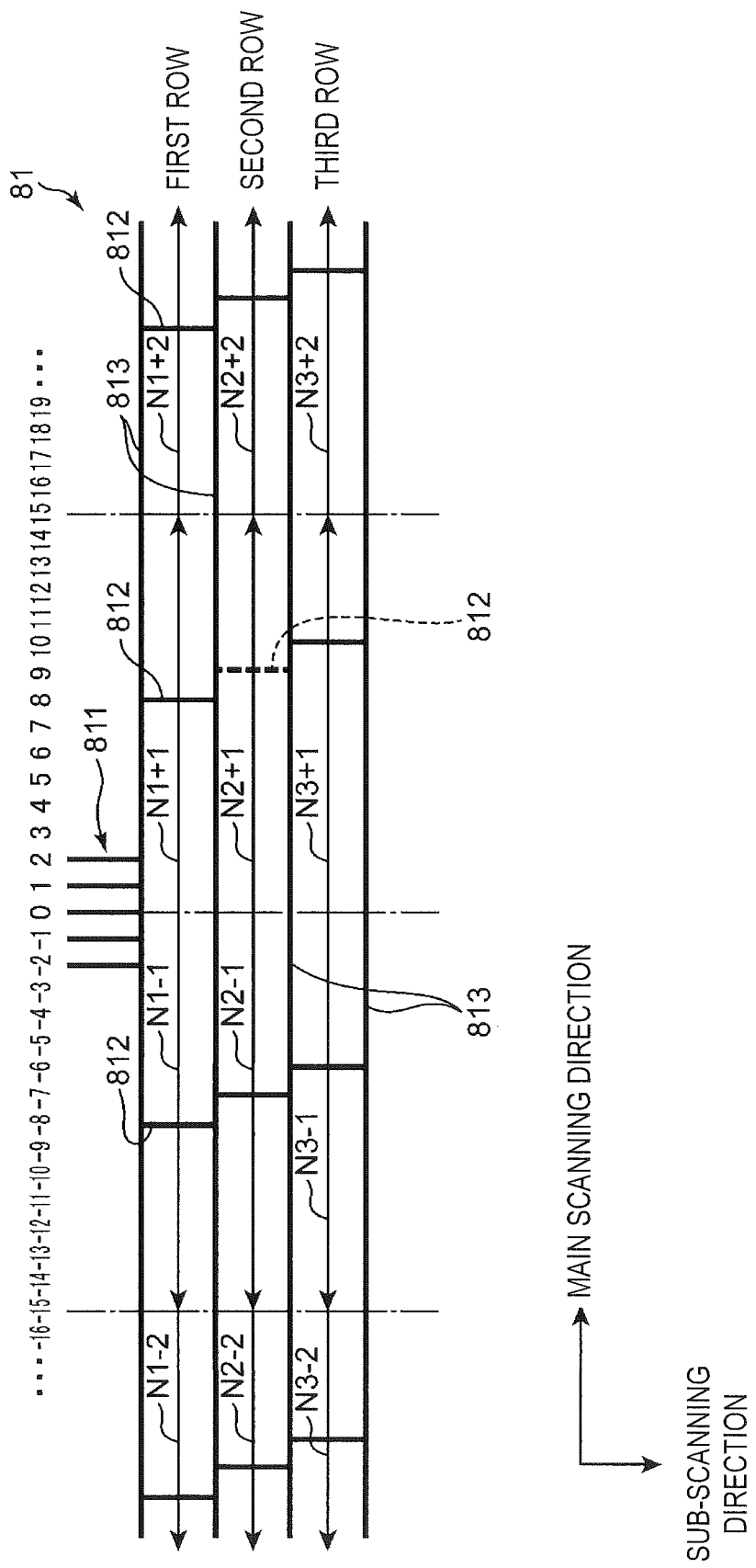
FIG. 12 is a view for explaining a process of finding an ejection failure nozzle.

FIG. 12 is a view for explaining an example of a process of finding an ejection failure nozzle. The nozzle check patterns 81 of the respective colors are each provided additionally with the reference address pattern 811 formed of longitudinal lines drawn by five pixels (nozzles 52). Relative to a center of the reference address pattern 811 (a reference address=0), a density value is detected for each block formed of a group of 16 pixels toward a downstream side and an upstream side in the main scanning direction. That is, in a first row, a density (a gradation value) of each of the pixels in a first block N1+1 on the downstream side and a first block N1−1 on the upstream side in the main scanning direction is checked, and it is found whether or not there is a pixel having a gradation value less than the threshold value Th. Further, upon detection of the pixel having a gradation value less than the threshold value Th in the block N1+1, one of the nozzles 52 corresponding to the reference address +8 is determined to be in the "ejection state," and upon non-detection of such a pixel, the one of the nozzles 52 is determined to be in the "ejection failure state." Upon detection of the pixel having a gradation value less than the threshold value Th in the block N1−1, one of the nozzles 52 corresponding to the reference address −8 is determined to be in the "ejection state," and upon non-detection of such a pixel, the one of the nozzles 52 is determined to be in the "ejection failure state."

Subsequently, in the first row, in a block N1+2 adjacent on the downstream side to the block N1+1 and a block N1−2 adjacent on the upstream side to the block N1−1 in the main scanning direction, it is similarly found whether or not there is a pixel having a gradation value less than the threshold value Th, and thus it is determined whether corresponding ones of the nozzles 52 are in the "ejection state" or the "ejection failure state." Thereafter, the determination is performed similarly for remaining blocks present in the first row. Furthermore, upon the end of the determination with respect to the first row, a transition is made to a second row, and upon the end of the determination with respect to the second row, a transition is made to a third row so that a similar determination is performed with respect to these rows. FIG. 12 schematically shows an example in which the individual pattern 812 is not drawn in a block N2+1 in the second row.

[Advantages of This Embodiment]

Figure 13:
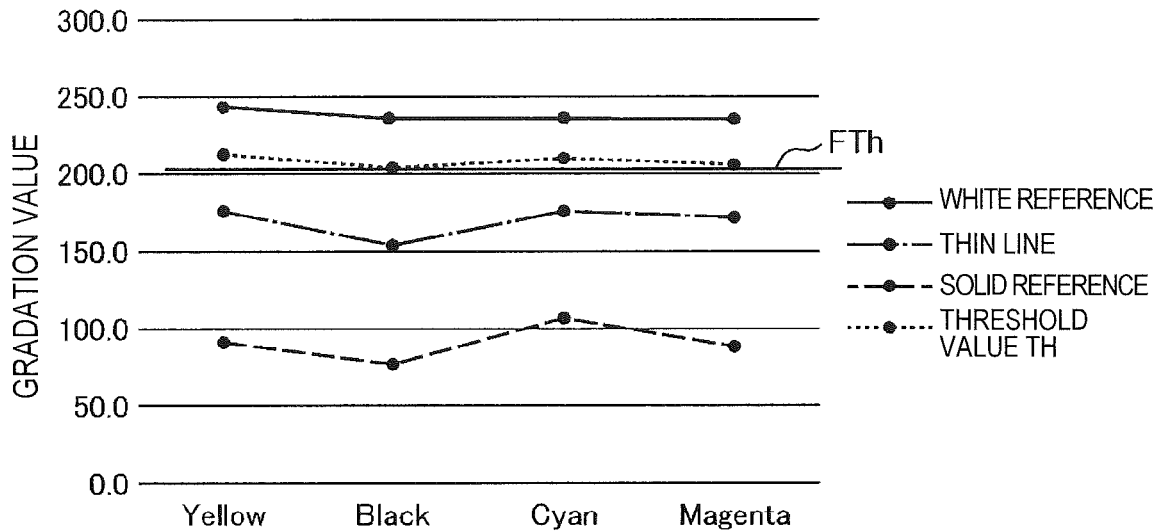
FIG. 13 is a graph showing an example of setting the threshold value in a case where a sheet on which a check chart is printed is a sheet of regular paper.
Figure 14:
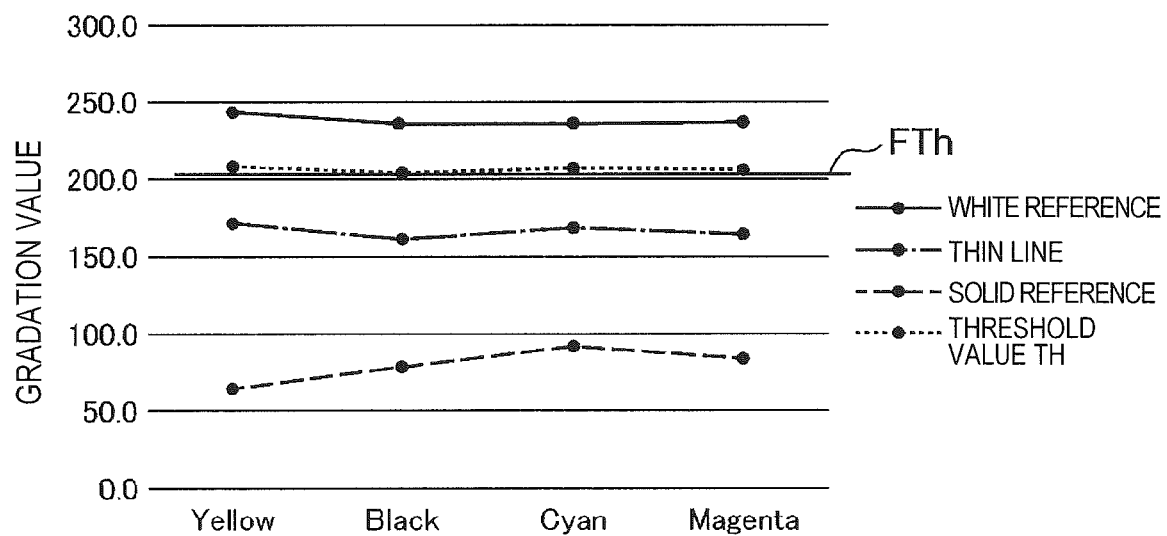
FIG. 14 is a graph showing an example of setting the threshold value in a case where the sheet on which a check chart is printed is a sheet of SuperFine paper.
Figure 15:
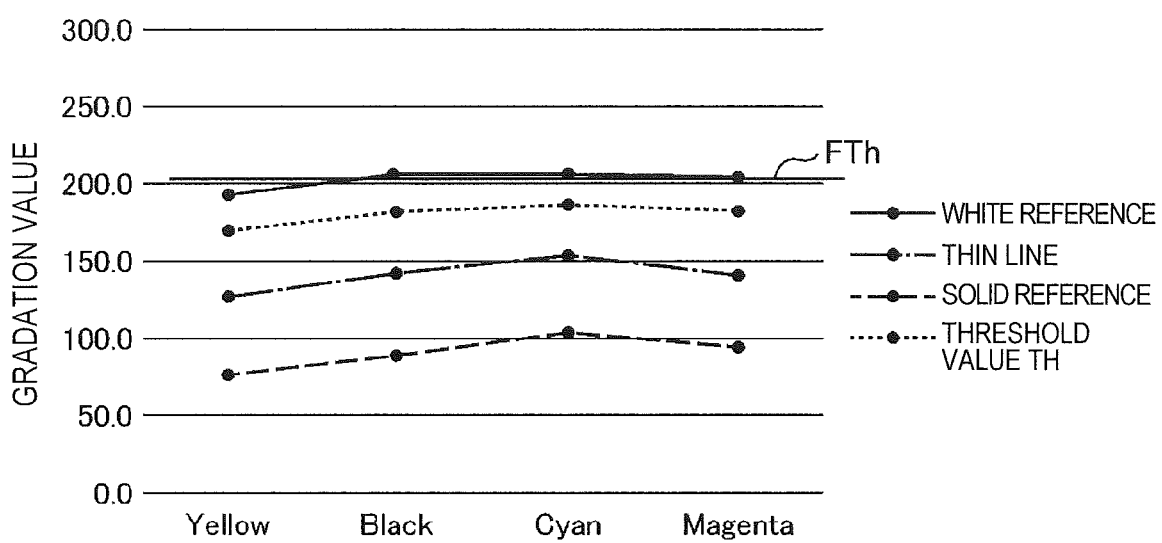
FIG. 15 is a graph showing an example of setting the threshold value in a case where the sheet on which a check chart is printed is a sheet of groundwood paper.

FIG. 13 to FIG. 15 are each a graph showing an example of setting the threshold value Th for each type of sheet on which a check chart is printed. FIG. 13 shows an example of setting the threshold value Th in a case where the sheet is a sheet of regular paper, FIG. 14 shows an example of setting the threshold value Th in a case where the sheet is a sheet of SuperFine paper, and FIG. 15 shows an example of setting the threshold value Th in a case where the sheet is a sheet of groundwood paper (low-quality paper). In each of the graphs shown in FIG. 13 to FIG. 15, the "white reference," "thin line (thin line assumed density," "solid reference," and "threshold value" illustratively shown in FIG. 11 are plotted for each of the respective colors of yellow, black, cyan, and magenta. Furthermore, FIG. 13 to FIG. 15 each additionally include a fixed threshold value FTh fixedly set to a vicinity of a gradation value=200 as a comparative example.

In all of the cases of regular paper (FIG. 13), SuperFine paper (FIG. 14), and groundwood paper (FIG. 15), the threshold value Th according to this embodiment is set to a vicinity of a gradation value intermediate between the "white reference" and the "thin line" for each of the respective colors. Thus, using the threshold value Th, it is possible to accurately determine whether or not the individual pattern 812 is drawn.

Even when the fixed threshold value FTh of the comparative example is adopted, in the cases of regular paper (FIG. 13) and SuperFine paper (FIG. 14), the fixed threshold value FTh is a gradation value substantially intermediate between the "white reference" and the "thin line," and thus it is possible to relatively accurately discriminate between the "white reference" and the "thin line." In the case of groundwood paper (FIG. 15), however, a gradation value of the fixed threshold value FTh is approximate to a gradation value of the "white reference." Particularly, in a case of yellow, the "white reference" has a gradation value smaller than that of the fixed threshold value FTh. Accordingly, it is not possible to distinguish between the "white reference" and the "thin line" by using the fixed threshold value FTh. In this embodiment, on the other hand, in the case of groundwood paper, the "white reference" and the "solid reference" are actually acquired and then the threshold value Th is flexibly set based thereon, and thus there is no possibility of occurrence of the above-described problem with the comparative example.

As has been discussed so far, according to the method or system for detecting an ejection abnormality according to this embodiment, the first density value AD1 indicating a density value (the white reference) of a ground color of a sheet on which the check chart 80 is printed and the second density value AD2 indicating a density value (the solid reference) of a solid pattern are acquired. Based on the first density value AD1, a density of a blank region on the sheet, in which no printing has been performed, is grasped. Furthermore, based on the second density value AD2, a density of a region on the sheet, in which solid printing using an ink liquid has been performed, is grasped. These are density values unique to the sheet prepared. For example, the first density value AD1 and the second density value AD2 acquired for high-quality paper have values corresponding to the high-quality paper, and the first density value AD1 and the second density value AD2 acquired for low-quality paper have values corresponding to the low-quality paper. Then, from the first density value AD1 and the second density value AD2, the threshold value Th for detecting an ejection abnormality of each of the nozzles 52 is derived based on, for example, the above expression (1), and thus the threshold value Th is also unique to the sheet prepared. Accordingly, regardless of a type of a sheet used to detect an ejection failure nozzle, using the threshold value Th, it is possible to accurately determine whether or not the individual patterns 812 (the check areas) of the nozzle check patterns 81 are drawn by the nozzles 52, respectively, i.e., whether or not each of the nozzles 52 is an ejection failure nozzle.

What is claimed is:

1. A method for detecting an ejection abnormality of a nozzle, in which in a liquid ejection head having a plurality of nozzles for ejecting liquids of prescribed respective colors, an ejection abnormality of each of the plurality of nozzles is detected, the method comprising steps of:
    causing the plurality of nozzles of the liquid ejection head to execute an operation of ejecting the liquids so that a nozzle check pattern including check areas each drawn solely by each of the plurality of nozzles and a solid pattern including a solid printed area are formed on part of a sheet;
    reading the sheet by an optical reader so that image data of the sheet is obtained;
    acquiring, based on the image data, a first density value indicating a density value of a ground color of the sheet and a second density value indicating a density value of the solid pattern;
    deriving a threshold value for detecting an ejection abnormality of each of the plurality of nozzles from the first density value and the second density value; and
    based on the image data, determining, using the threshold value, whether or not each of the check areas of the nozzle check pattern is drawn.

2. The method according to claim 1, wherein
    when the threshold value is denoted as Th, the first density value as AD1, the second density value as AD2, and a third density value indicating an assumed density value of each of the check areas as AD3, which are expressed in terms of gradation values, and there is established a relationship AD1>AD3>AD2, the threshold value Th is set using an expression (1) below:
    $$Th=(AD1-AD2)\times B+AD2 \quad (1)$$
    where B is a coefficient set in such a range that Th>AD3.

3. The method according to claim 1, wherein
    the first density value is an average of density values of the ground color of the sheet detected at a plurality of locations on the sheet, and
    the second density value is an average of density values of the solid pattern detected at a plurality of locations on the solid pattern.

4. The method according to claim 1, further comprising a step of:
    before the sheet is read by the optical reader, detecting reading unevenness of the optical reader and correcting the reading unevenness.

5. A system for detecting an ejection abnormality of a nozzle, comprising:
    a liquid ejection head having a plurality of nozzles for ejecting liquids of prescribed respective colors;
    an ejection control portion that controls an operation of ejecting the liquids from the plurality of nozzles;
    an optical reader that reads an image of a sheet and generates image data thereof; and
    a processor that executes a prescribed process based on the image data,
    wherein
    the ejection control portion forms, on part of the sheet, a nozzle check pattern including check areas each drawn solely by each of the plurality of nozzles and a solid pattern including a solid printed area,
    the optical reader reads the sheet on which the nozzle check pattern and the solid pattern have been formed and thus generates image data of the sheet, and
    the processor includes:
        a density acquisition portion that acquires, based on the image data, a first density value indicating a density value of a ground color of the sheet and a second density value indicating a density value of the solid pattern;
        a threshold value setting portion that sets, based on the first density value and the second density value, a threshold value for detecting an ejection abnormality of each of the plurality of nozzles; and
        a determination portion that, based on the image data, determines, using the threshold value, whether or not each of the check areas of the nozzle check pattern is drawn and determines which one of the plurality of nozzles is an ejection failure nozzle.

\* \* \* \* \*